(12) United States Patent
Sreenivasaiah et al.

(10) Patent No.: US 11,841,759 B2
(45) Date of Patent: Dec. 12, 2023

(54) FAULT TOLERANCE HANDLING FOR SERVICES

(71) Applicant: VMware, Inc., Palo Alto, CA (US)

(72) Inventors: Santhosh Sreenivasaiah, Woodinville, WA (US); Mansi Shah, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/657,836

(22) Filed: Apr. 4, 2022

(65) Prior Publication Data

US 2023/0315554 A1    Oct. 5, 2023

(51) Int. Cl.
*G06F 11/00*    (2006.01)
*G06F 11/07*    (2006.01)

(52) U.S. Cl.
CPC ........ *G06F 11/0754* (2013.01); *G06F 11/004* (2013.01); *G06F 11/0709* (2013.01); *G06F 2201/81* (2013.01)

(58) Field of Classification Search
CPC .. G06F 11/004; G06F 11/008; G06F 11/1461; G06F 3/0617; G06F 3/0634; G06F 3/0646; G06F 3/065; H04L 41/50; H04L 41/5012; H04L 41/5019; H04L 41/5025
See application file for complete search history.

(56) References Cited

U.S. PATENT DOCUMENTS

| | | | | |
|---|---|---|---|---|
| 6,854,069 | B2 * | 2/2005 | Kampe | H04L 41/0893 714/48 |
| 7,552,438 | B1 * | 6/2009 | Werme | H04L 67/1001 709/224 |
| 8,639,971 | B1 * | 1/2014 | White | G06F 11/3034 714/6.24 |
| 9,740,472 | B1 * | 8/2017 | Sohi | G06F 15/173 |
| 2011/0099266 | A1 * | 4/2011 | Calder | H04L 41/5041 709/224 |
| 2011/0107135 | A1 * | 5/2011 | Andrews | G06F 3/0607 714/E11.004 |
| 2014/0376362 | A1 * | 12/2014 | Selvaraj | H04L 41/082 370/221 |
| 2015/0178137 | A1 * | 6/2015 | Gordon | G06F 9/5061 709/226 |
| 2021/0389991 | A1 * | 12/2021 | Chu | G06F 8/65 |

* cited by examiner

*Primary Examiner* — Marc Duncan
(74) *Attorney, Agent, or Firm* — Dinsmore & Shohl LLP

(57) ABSTRACT

The disclosure provides an approach for fault tolerance handling. Embodiments include determining, by a management component, that a host stores data relating to a service. Embodiments include receiving, by the management component, fault tolerance information from the service, the fault tolerance information comprising first information about host failures tolerated by the service and second information about existing host failures related to the service. Embodiments include determining, by the management component, based on the fault tolerance information from the service, whether the service will tolerate the host becoming unavailable. Embodiments include performing, by the management component, one or more actions based on the determining of whether the service will tolerate the host becoming unavailable.

16 Claims, 4 Drawing Sheets

FAULT TOLERANCE HANDLING FOR SERVICES

BACKGROUND

A software-defined data center (SDDC) may comprise a plurality of hosts in communication over a physical network infrastructure. Each host is a physical computer (machine) that may run one or more virtualized endpoints such as virtual machines (VMs), containers, and/or other virtual computing instances (VCIs). In some cases, VCIs are connected to software-defined networks (SDNs), also referred to herein as logical overlay networks, that may span multiple hosts and are decoupled from the underlying physical network infrastructure. Various services may run on hosts in SDDCs, and may be implemented in a fault tolerant manner, such as through replication across multiple hosts.

In some cases a host may need to be placed in maintenance mode in order to perform maintenance operations, and data stored on the host may be unavailable during such time. Maintenance mode is generally used to perform firmware updates, security patches, hardware refresh/replacement, and other types of software and/or hardware maintenance operations on a host. If data related to a given service is stored on a given host, then placing the given host in maintenance mode may impact the functioning of the given service, particularly if the data related to the service is not available on a different host (e.g., in a fault tolerant storage arrangement).

Certain existing techniques for maintenance mode handling for services involve relying on individual services that have data stored on a given host to implement logic for determining whether the given host should be placed in maintenance mode. However, these techniques do not scale well, involve redundant logic across multiple services, and require providers of individual services to have an understanding of the underlying infrastructure in order to implement maintenance mode handling logic.

Accordingly, there is a need in the art for improved techniques for maintenance mode handling for services.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
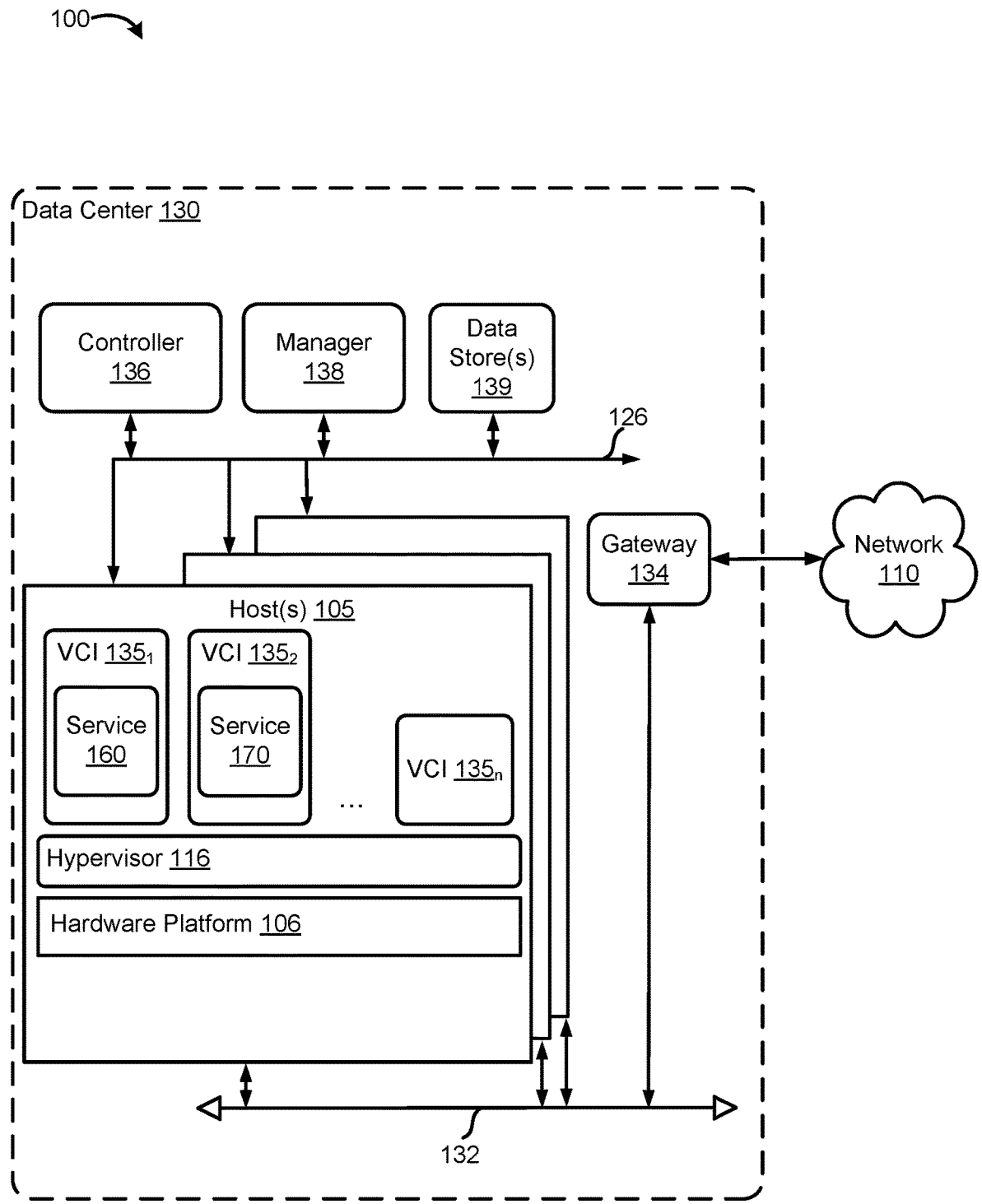
FIG. 1 depicts example physical and virtual network components with which embodiments of the present disclosure may be implemented.

The present disclosure provides an approach for maintenance mode handling for services, particularly for stateful services. A stateful service maintains state information based on past sessions or transactions, and may respond differently to the same inputs based on the past sessions or transactions. As such, it is important for stateful services to be implemented in a fault-tolerant manner so that state information remains accessible even in the event of a host failure. According to certain embodiments, a data persistence platform implemented in a networking environment allows stateful services to implement their own fault tolerance logic, such as replication, while using local storage of the hosts in the data centers on which the services are located, such as for optimal performance and cost (e.g., as compared to relying on remote cloud storage for replication).

When a host must undergo maintenance, the host is placed in maintenance mode and becomes unavailable until maintenance is complete. Thus, a host generally should not be placed in maintenance mode if the host stores data that relates to a stateful service and is not available at another location. Thus, according to techniques described herein, a management component determines whether to proceed with placing a host in maintenance mode based on fault tolerance information received from services that have data stored on the host.

In certain embodiments, services publish fault tolerance information to a data store. The fault tolerance information published by a service may include, for example, information about host failures tolerated by the service (e.g., a number of host failures tolerated by the service), information about current host failures affecting the service (e.g., a number of hosts that store information related to the service and that are currently in a failed state and, in some embodiments, identifiers of any such hosts), and/or the like. In some embodiments, the fault tolerance information comprises metadata (e.g., indicating a time at which the fault tolerance information was generated) for use in confirming that the fault tolerance information is not stale. The data store may be a platform as a service (PAAS) or container as a service (CAAS) object such as, for example, a Kubernetes® object.

The management component may subscribe to the data store in order to receive the fault tolerance information for use in determining whether to place hosts in maintenance mode. For example, prior to placing a host in maintenance mode, the management component may determine which services would be impacted by placing the host in maintenance mode, and retrieve the most recent fault tolerance information for those services from the data store (or from local storage if the management component has already received the fault tolerance information). The management component then uses the fault tolerance information from the services to determine whether the services can tolerate placing the host in maintenance mode. For example, if a service that has data stored on the host can tolerate one host failure and a host failure has already occurred (e.g., if another host storing data related to the service is currently in a failed state) then the service cannot tolerate placing the host in maintenance mode.

The management component may take action based on its determinations of whether services can tolerate placing the host in maintenance mode. If all services that have data stored on the service can tolerate placing the host in maintenance mode, then the management component may proceed with placing the host in maintenance mode, which may involve draining service data from the host prior to placing the host in maintenance mode. For example, services may store data in storage pods on hosts, and such storage pods may be deleted from a host before the host is placed in maintenance mode. However, if one or more services that have data stored on the host cannot tolerate placing the host in maintenance mode, then the management component may halt or delay placing the host in maintenance mode. For example, the management component may delay placing the host in maintenance mode until all services that have data stored on the host can tolerate placing the host in maintenance mode (e.g., when one or more other host failures have been resolved, when data relating to one or more services has been moved from the host to a different location, and/or once a fault tolerance configuration of one or more services has been changed). It is noted that a service's tolerance of a host becoming unavailable, as used herein, generally refers to whether all data of the service will remain available if the host becomes unavailable (e.g., whether the fault-tolerant implementation of the service will tolerate an additional host failure in view of any existing host failures).

In some cases, the management component may take action to resolve an issue. For instance, the management component may move data related to a service from the host to a different host so that the host can be placed in maintenance mode without impacting availability of the data. In other embodiments the management component may generate one or more notifications relating to halting or delaying placing a host in maintenance mode and/or indicating that a given service cannot tolerate placing the host in maintenance mode.

In some cases, the management component may determine whether there is a spare host available to which data of a service may be moved, such as while maintenance operations are being performed on a host. For example, when data of a service becomes unavailable on a given host (e.g., due to placing the host in maintenance mode), if a spare host is available, the management component may re-create the data of the service on the spare host to ensure continued data availability.

Accordingly, embodiments of the present disclosure constitute an improvement over existing maintenance mode management techniques by providing centralized evaluation of fault tolerance information from services in order to determine whether to place hosts in maintenance mode. Embodiments of the present disclosure thereby avoid disruptions to services in association with maintenance mode operations while avoiding drawbacks associated with separate implementation of maintenance mode handling logic by individual services (e.g., poor scalability, redundant logic, requiring providers of individual services to have an understanding of the underlying infrastructure in order to implement maintenance mode handling logic, and the like). Additionally, by abstracting maintenance mode handling logic away from individual services, techniques described herein improve the efficiency of onboarding new services to the infrastructure, as the services do not need to learn about the maintenance mode handling logic of the infrastructure.

It is noted that, while embodiments related to maintenance mode handling are described herein, techniques set forth in the present application may be used more broadly for centralized management of fault tolerance. For example, a management component may receive fault tolerance information from services as described herein, and may determine in a centralized manner, based on the received fault tolerance information, whether additional faults can be tolerated by the services. This functionality is not limited to the context of determining whether to place a host in maintenance mode. For example, the management component may also or alternatively perform other operations based on determining whether a service can tolerate an additional host failure, such as migrating VCIs and/or services, notifying one or more entities of a fault tolerance determination, determining placements of additional VCIs and/or services, load balancing, performing updates and/or maintenance operations that do not require placing hosts in maintenance mode, and/or the like. By unifying fault tolerance logic across multiple services in a centralized manner, techniques described herein allow aspects of fault tolerance logic to be abstracted away from individual services.

FIG. 1 depicts example physical and virtual network components with which embodiments of the present disclosure may be implemented.

Networking environment 100 includes data center 130 connected to network 110. Network 110 is generally representative of a network of machines such as a local area network ("LAN") or a wide area network ("WAN"), a network of networks, such as the Internet, or any connection over which data may be transmitted.

Data center 130 generally represents a set of networked machines and may comprise a logical overlay network. Data center 130 includes host(s) 105, a gateway 134, a data network 132, which may be a Layer 3 network, and a management network 126. Host(s) 105 may be an example of machines. Data network 132 and management network 126 may be separate physical networks or different virtual local area networks (VLANs) on the same physical network.

It is noted that, while not shown, additional data centers may also be connected to data center 130 via network 110. Communication between the different data centers may be performed via gateways associated with the different data centers.

Each of hosts 105 may include a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 for multiple virtual computing instances (VCIs) 135$i$ to 135$n$ (collectively referred to as VCIs 135 and individually referred to as VCI 135) that run concurrently on the same host. VCIs 135 may include, for instance, VMs, containers, virtual appliances, and/or the like. VCIs 135 may be an example of machines.

In certain aspects, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. It is noted that the term "operating system," as used herein, may refer to a hypervisor. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Gateway 134 provides VCIs 135 and other components in data center 130 with connectivity to network 110, and is used to communicate with destinations external to data center 130 (not shown). Gateway 134 may be implemented as one or more VCIs, physical devices, and/or software modules running within one or more hosts 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user. In some embodiments, manager 138 comprises a virtualization manager, which is an application that provides an interface to hardware platform 106. A virtualization manager is configured to carry out various tasks to manage virtual computing resources. For example, a virtualization manager can deploy VCIs in data center 130 and/or perform other administrative tasks with respect to VCIs.

According to embodiments of the present disclosure, a manager 138 may perform maintenance mode management functionality, such as determining whether to place a host 105 in maintenance mode based on fault tolerance information from services (e.g., services 160 and 170) that have data stored on the host 105.

According to certain embodiments, services 160 and 170 publish fault tolerance information, such as information about host failures tolerated and any current host failures affecting services 160 and 170, to one or more data stores 139. A data store 139 may be, for example, an object to which information is published and to which manager 138 may subscribe in order to receive the information. In one example, a data store 139 is a PAAS or CAAS object such as, for example, a Kubernetes® object. In some embodiments, a data store 139 can be storage in a cloud environment, storage in a device (e.g., a host 105), storage in a virtual storage area network (vSAN) or storage area network (SAN), network accessible storage, or any appropriate type of storage in any suitable location.

In an example, services 160 and 170 running on VCIs 135₁ and 135₂ are stateful services that utilize storage of one or more hosts 105. Services 160 and 170 may have fault-tolerant configurations, such as involving replication across a plurality of hosts 105. For example, service 160 may be replicated across two hosts 105 and may tolerate one host failure, and service 170 may be replicated across three hosts 105 and may tolerate two host failures. These fault-tolerant configurations are included as examples, and other configurations are possible.

As described in more detail below with respect to FIG. 2, services 160 and 170 may publish information about their fault tolerant configurations to one or more of data stores 139. For example, services 160 and 170 may publish a number of host failures tolerated and, in some embodiments, identifiers of the hosts on which data related to services 160 and 170 are stored. Furthermore, if a host failure occurs with respect to a host on which data of a given service 160 or 170 is stored, then that service 160 or 170 may publish information to the one or more of data stores 139 indicating that the host failure occurred and, in some embodiments, an identifier of the host that failed. For example, a service may determine that a host has failed based on a failure to receive a heartbeat message from that host for a threshold amount of time. In another example, a controller of a service may track the operational statuses of hosts on which data of the service is stored (e.g., by requesting and/or receiving confirmations of operational status from the hosts at regular intervals), and may publish information to the one or more of data stores 139 when a host failure occurs.

Manager 138 may subscribe to data store(s) 139, and so may receive the fault tolerance information from services 160 and 170 (e.g., whenever such information is published to data store(s) 139, at regular intervals, and/or upon request by manager 138). For example, if manager 138 subscribes to data store(s) 139, data store(s) 139 may send all new information published to data store(s) 139 to manager 138 as it is received based on the subscription. In alternative embodiments, manager 138 receives the fault tolerance information directly from services 160 and 170.

According to certain embodiments, manager 138 determines whether to place host 105 in maintenance mode based on the fault tolerance information from services 160 and 170. For example, if the fault tolerance information indicates that both services 160 and 170 can tolerate placing the host in maintenance mode (e.g., if both of services 160 and 170 can tolerate an additional host becoming unavailable) then manager 138 may proceed with placing host 105 in maintenance mode. If the fault tolerance information indicates that one or both of services 160 and 170 cannot tolerate placing the host in maintenance mode (e.g., one or both of services 160 and 170 cannot tolerate an additional host becoming unavailable) then manager 138 may halt or delay placing host 105 in maintenance mode. In some embodiments, manager 138 may delay placing host 105 in maintenance mode until subsequently received fault tolerance information indicates that both services 160 and 170 can tolerate placing the host in maintenance mode. In certain embodiments, manager 138 may take action to resolve an issue, such as moving data related to service 160 and/or service 170 to a different host and/or notifying an administrator of service 160 and/or 170 that host 105 cannot be placed in maintenance mode and, in some cases, suggesting actions to resolve the issue. In some cases, manager 138 may determine whether a spare host is available, and may re-create data of a given service on the spare host if such data becomes unavailable on another host (e.g., due to placing the other host in maintenance mode). Furthermore, manager 138 may perform operations other than determining whether to place a host in maintenance mode based on its determinations of whether services can tolerate hosts becoming unavailable. For example, manager 138 may generate notifications related to fault tolerance determinations, change fault tolerance configurations of services, move VCIs and/or services between hosts, place VCIs and/or services on hosts, perform other installations, upgrades, and/or maintenance operations that do not require maintenance mode, and/or the like based on determining whether one or more services can tolerate one or more additional hosts becoming unavailable.

Services 160 and 170 are depicted as examples, and hosts may store data related to more or fewer services. In some cases, data related to a service comprises a replica of the service or a replica of a portion of the service. It is further noted that actions described herein as being performed by manager 138 may be performed by one or more components of a virtualization manager, such as a data persistence platform running on a cluster of machines within the virtualization manager (e.g., a supervisor cluster), and/or by one or more other components.

Figure 2:
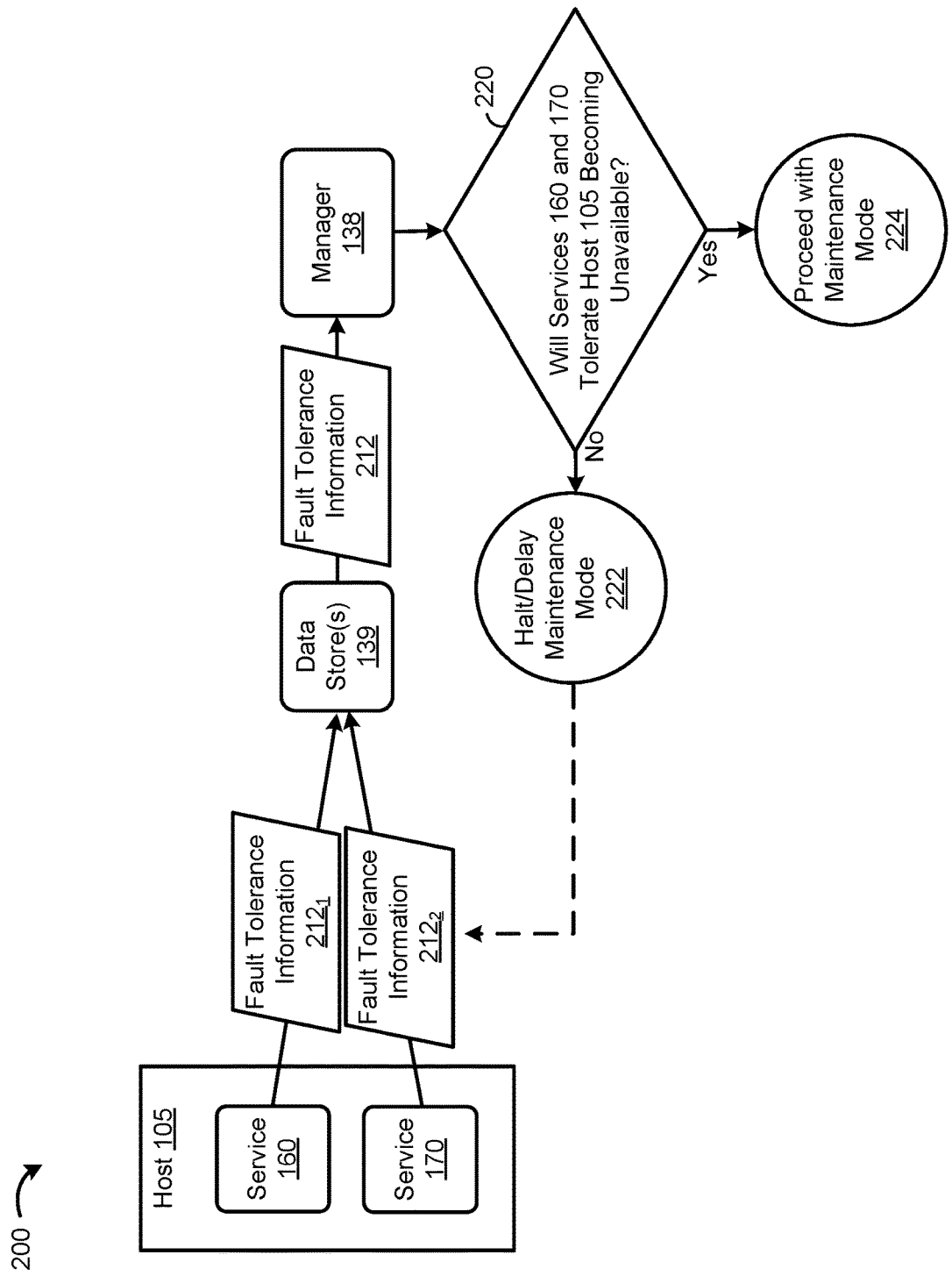
FIG. 2 illustrates an example of fault tolerance handling for services, according to embodiments of the present disclosure.

FIG. 2 depicts an illustration 200 of an example of fault tolerance handling for services, according to embodiments of the present disclosure. Illustration 200 includes host 105, services 160 and 170, data store(s) 139, and manager 138 of FIG. 1.

Services 160 and 170 provide fault tolerance information $212_1$ and $212_2$ (collectively, fault tolerance information 212) to one or more data store(s) 139. For instance, service 160 may publish fault tolerance information $212_1$ to a first data store 139 (e.g., a first data object) and service 170 may publish fault tolerance information $212_2$ to a second data store 139 (e.g., a second data object). Alternatively, services 160 and 170 provide fault tolerance information $212_1$ and $212_2$ to a common data store 139.

As described in more detail below with respect to FIG. 3, fault tolerance information $212_1$ and $212_2$ generally comprise information about host failures tolerated by services 160 and 170, information about any current host failures affecting services 160 and/or 170, and, in some embodiments, metadata (e.g., for use in confirming whether fault tolerance information $212_1$ and $212_2$ is stale). For instance, the metadata may include a sequence identifier, a timestamp, and/or other information indicating how recently the fault tolerance information was generated.

Manager 138 receives fault tolerance information 212 from data store(s) 139, such as by subscribing to one or more data objects. In some embodiments, manager 138 first confirms that the fault tolerance information received from each of service 160 and 170 is not stale, such as based on metadata indicating how recently the fault tolerance information was generated. If manager 138 determines that fault tolerance information from a service is stale (e.g., was generated more than a threshold amount of time ago), then manager 138 may request updated fault tolerance information from that service. For instance, a request to a given service may be routed to an instance of the service on a host that is currently available.

Manager 138 then determines at step 220 whether services 160 and 170 will tolerate host 105 becoming unavailable. For instance, manager 138 may analyze fault tolerance information 212 to determine whether host 105 becoming unavailable as a result of entering maintenance mode would cause a total number of tolerated host failures to be exceeded for service 160 and/or 170.

If service 160 and/or 170 cannot tolerate host 105 becoming unavailable, then manager 138 halts or delays placing host 105 in maintenance mode at step 222. For example, manager 138 may delay placing host 105 in maintenance mode until both of services 160 and 170 can tolerate host 105 becoming unavailable. In some embodiments, manager 138 may take action such as moving data relating to service 160 and/or 170 from host 105 to a different host and then proceed with placing host 105 in maintenance mode. In some cases, if manager 138 halts or delays placing host 105 in maintenance mode, manager 138 notifies one or more components that host 105 was not placed in maintenance mode and/or that action should be taken so that services 160 and/or 170 can tolerate placing host 105 in maintenance mode.

If services 160 and 170 can both support host 105 becoming unavailable, then manager 138 proceeds with placing host 105 in maintenance mode at step 224. For example, manager 138 may initiate a process for placing host 105 in maintenance mode, and maintenance operations may then be performed on host 105. In some cases, manager 138 notifies one or more components that host 105 has been or will be placed in maintenance mode.

Figure 3:
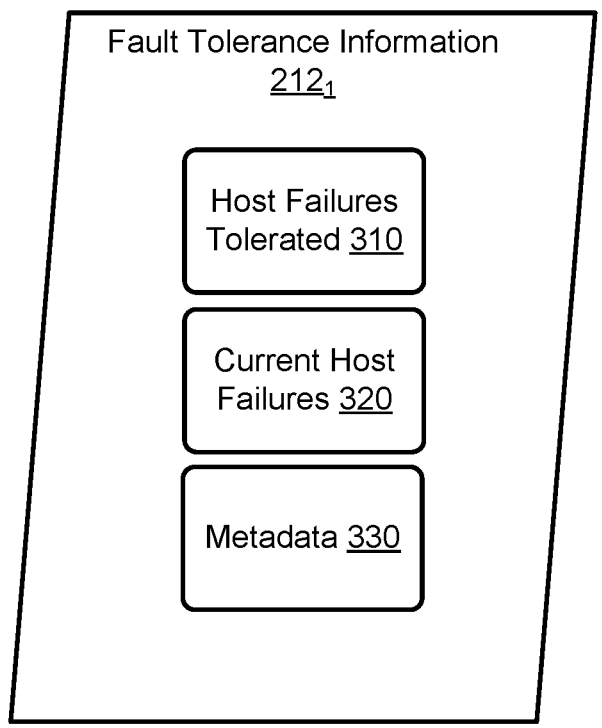
FIG. 3 illustrates an example of fault tolerance information provided by a service to a management component for use in fault tolerance handling.

FIG. 3 is an illustration 300 of an example of fault tolerance information provided by a service to a management component for use in maintenance mode handling and/or other fault tolerance handling. Illustration 300 includes fault tolerance information $212_1$ of FIG. 2.

Fault tolerance information $212_1$ comprises host failures tolerated 310, current host failures 320, and metadata 330.

Host failures tolerated 310 generally indicates a number of host failures tolerated by a service (e.g., service 160 of FIG. 2). For example, the service's data may be distributed as a plurality of components (e.g., including subsets of the service's data) across a plurality of hosts, including a certain number of replicas of each component, such that a certain number of host failures may be tolerated while still maintaining availability of the entirety of the service's data. For example, a fault tolerance policy for the service may indicate a number of failures to tolerate (FTT), meaning that the service must be implemented in such a way as to guarantee data access even in the event that a certain number of hosts fail.

Current host failures 320 generally indicates a number of hosts storing data relating to the service that are currently in a failed state and, in some embodiments, identifiers of any such failed hosts. For example, if one host storing the service's data is currently in a failed state, then current host failures 320 may indicate that there is one host failure currently affecting the service and, in some embodiments, may indicate an identifier of the failed host.

Metadata 330 generally includes data about fault tolerance information $212_1$, such as information indicating how recently fault tolerance information $212_1$ was generated the service. For example, metadata 330 may include a sequence identifier, a timestamp, and/or other information that indicates when fault tolerance information $212_1$ was generated.

Metadata 330 may be used to determine whether fault tolerance information $212_1$ was generated recently enough to be relied upon in determining whether the service can tolerate placing the host in maintenance mode. For example, manager 138 of FIGS. 1 and 2 may check metadata 300 to determine how recently fault tolerance information $212_1$ was generated and, if it determines that fault tolerance information $212_1$ is stale, may request updated fault tolerance information from the data store and/or the service.

Figure 4:
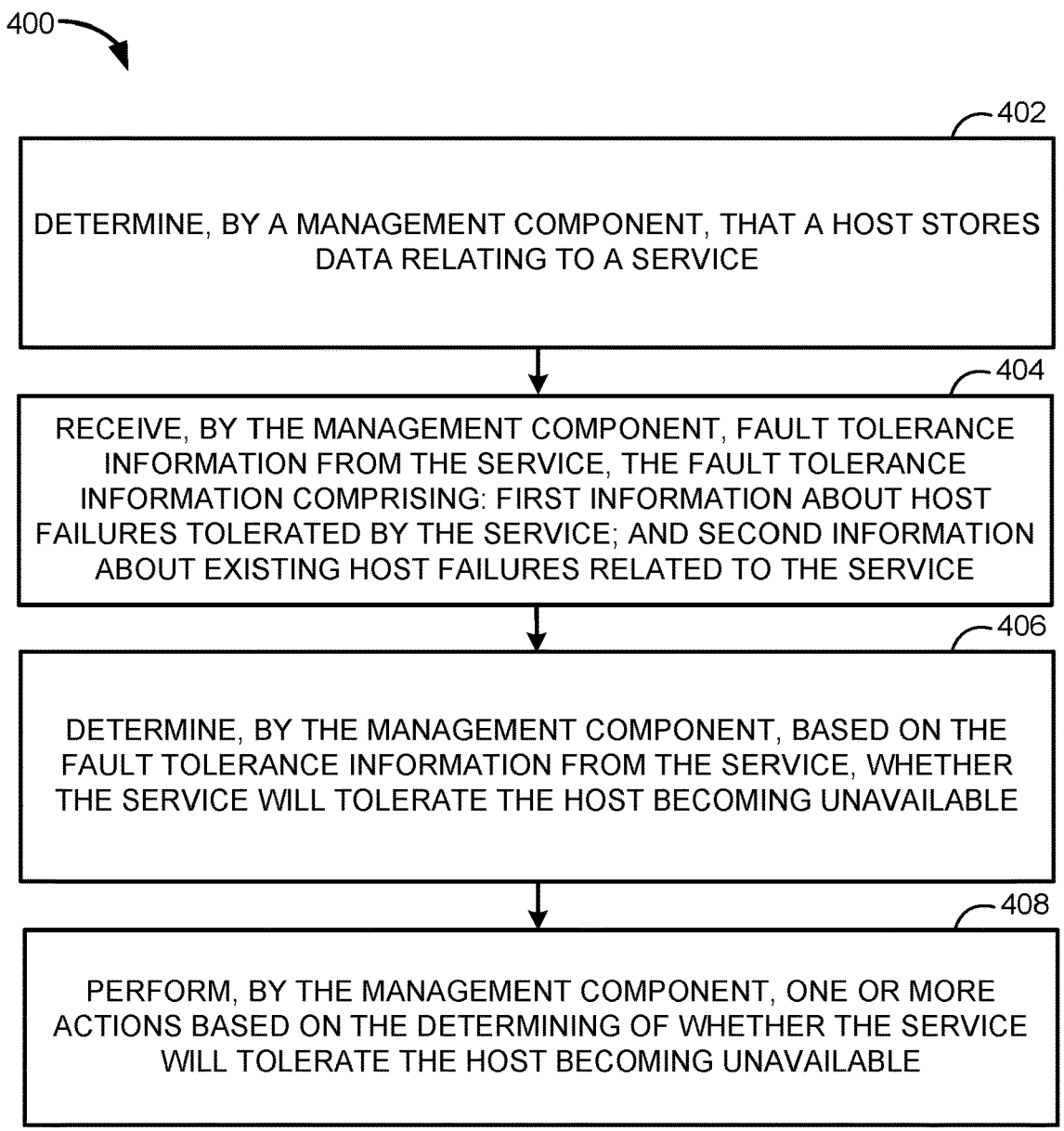
FIG. 4 depicts example operations related to fault tolerance handling for services.

FIG. 4 depicts example operations 400 related to fault tolerance handling for services. For example, operations 400 may be performed by one or more components of manager 138 of FIGS. 1 and 2, and may correspond to techniques for fault tolerance handling that are described above with respect to FIG. 2.

Operations 400 begin at step 402, with determining, by a management component, that a host stores data relating to a service.

Operations 400 continue at step 404, with receiving, by the management component, fault tolerance information from the service, the fault tolerance information comprising: first information about host failures tolerated by the service; and second information about existing host failures related to the service.

In some embodiments, receiving, by the management component, the fault tolerance information from the service comprises receiving the fault tolerance information from a data storage entity, wherein the fault tolerance information was published to the data storage entity by the service.

Certain embodiments further comprise determining, by the management component, that the fault tolerance information is not stale based on metadata associated with the fault tolerance information.

Operations 400 continue at step 406, with determining, by the management component, based on the fault tolerance information from the service, whether the service will tolerate the host becoming unavailable. Certain embodiments comprise determining, by the management component, based on the fault tolerance information from the service, whether to place the host in maintenance mode (e.g., based on whether the service will tolerate the host becoming unavailable).

Operations 400 continue at step 408, with performing, by the management component, one or more actions based on the determining of whether the service will tolerate the host becoming unavailable.

In some embodiments, the one or more actions comprise placing the host in maintenance mode.

In some embodiments, the one or more actions comprise: migrating, by the management component, the data relating to the service from the host to a different host; and placing the host in the maintenance mode.

In certain embodiments, the one or more actions comprise delaying placing the host in the maintenance mode. Some embodiments further comprise receiving, by the management component, updated fault tolerance information from the service, determining, by the management component, based on the updated fault tolerance information, to place the host in the maintenance mode, and placing, by the management component, the host in the maintenance mode.

Some embodiments further comprise determining, by the management component, whether a spare host is available (e.g., in a host cluster comprising the host). For example, the management component may re-create the data relating to the service on the spare host or otherwise move the data relating to the service to the spare host (e.g., prior to or when the data relating to the service becomes unavailable on the host, such as if the host is placed in maintenance mode).

Certain embodiments further comprise determining, by the management component, that the host stores additional data relating to an additional service and receiving, by the management component, additional fault tolerance information from the additional service. For example, performing, by the management component, the one or more actions may be further based on the additional fault tolerance information.

Some embodiments further comprise determining, by the management component, based on the fault tolerance information and the additional fault tolerance information, that the service will tolerate the host becoming unavailable and that the additional service will not tolerate the host becoming unavailable. For example, performing, by the management component, the one or more may comprise halting or delaying placing the host in the maintenance mode.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of fault tolerance handling, comprising:
   determining, by a management component, that a host stores data relating to a service;
   receiving, by the management component, fault tolerance information from the service, the fault tolerance information comprising:
      first information about host failures tolerated by the service; and
      second information about existing host failures related to the service;
   determining, by the management component, based on the fault tolerance information from the service, whether the service will tolerate the host becoming unavailable;
   performing, by the management component, one or more actions based on the determining of whether the service will tolerate the host becoming unavailable, wherein the one or more actions comprise placing the host in a maintenance mode;
   determining, by the management component, that a spare host is available; and
   re-creating, by the management component, the data relating to the service from the host on the spare host.

2. The method of claim 1, wherein receiving, by the management component, the fault tolerance information from the service comprises receiving the fault tolerance information from a data storage entity, wherein the fault tolerance information was published to the data storage entity by the service.

3. The method of claim 1, further comprising determining, by the management component, that the fault tolerance information is not stale based on metadata associated with the fault tolerance information.

4. The method of claim 1, further comprising determining, by the management component, based on the fault tolerance information from the service, whether to place the host in the maintenance mode based on the determining of whether the service will tolerate the host becoming unavailable.

5. The method of claim 1, wherein the one or more actions comprise delaying placing the host in the maintenance mode.

6. The method of claim 5, wherein the one or more actions further comprise:
   receiving, by the management component, updated fault tolerance information from the service; and
   determining, by the management component, based on the updated fault tolerance information, to place the host in the maintenance mode.

7. The method of claim 1, further comprising:
   determining, by the management component, that the host stores additional data relating to an additional service; and
   receiving, by the management component, additional fault tolerance information from the additional service, wherein the performing, by the management component, the one or more actions is further based on the additional fault tolerance information.

8. The method of claim 7, further comprising determining, by the management component, based on the fault tolerance information and the additional fault tolerance information, that the service will tolerate the host becoming unavailable and that the additional service will not tolerate the host becoming unavailable, wherein the performing, by the management component, the one or more actions comprises delaying placing the host in the maintenance mode.

9. A system for processing application programming interface (API) requests, the system comprising:
   at least one memory; and
   at least one processor coupled to the at least one memory, the at least one processor and the at least one memory configured to:
      determine, by a management component, that a host stores data relating to a service;
      receive, by the management component, fault tolerance information from the service, the fault tolerance information comprising:
         first information about host failures tolerated by the service; and
         second information about existing host failures related to the service;

determine, by the management component, based on the fault tolerance information from the service, whether the service will tolerate the host becoming unavailable;

perform, by the management component, one or more actions based on the determining of whether the service will tolerate the host becoming unavailable, wherein the one or more actions comprise placing the host in a maintenance mode;

determine, by the management component, that a spare host is available; and re-create, by the management component, the data relating to the service from the host on the spare host.

10. The system of claim 9, wherein receiving, by the management component, the fault tolerance information from the service comprises receiving the fault tolerance information from a data storage entity, wherein the fault tolerance information was published to the data storage entity by the service.

11. The system of claim 9, wherein the at least one processor and the at least one memory are further configured to determine, by the management component, that the fault tolerance information is not stale based on metadata associated with the fault tolerance information.

12. The system of claim 9, wherein the least one processor and the at least one memory are further configured to determine, by the management component, based on the fault tolerance information from the service, whether to place the host in the maintenance mode based on the determining of whether the service will tolerate the host becoming unavailable.

13. The system of claim 9, wherein the one or more actions comprise delaying placing the host in the maintenance mode.

14. The system of claim 13, wherein the one or more actions comprise:

receiving, by the management component, updated fault tolerance information from the service; and determining, by the management component, based on the updated fault tolerance information, to place the host in the maintenance mode.

15. The system of claim 9, wherein the at least one processor and the at least one memory are further configured to:

determine, by the management component, that the host stores additional data relating to an additional service; and receive, by the management component, additional fault tolerance information from the additional service, wherein the performing, by the management component, the one or more actions is further based on the additional fault tolerance information.

16. A non-transitory computer-readable medium storing instructions that, when executed by one or more processors, cause the one or more processors to:

determine, by a management component, that a host stores data relating to a service;

receive, by the management component, fault tolerance information from the service, the fault tolerance information comprising:

first information about host failures tolerated by the service; and second information about existing host failures related to the service;

determine, by the management component, based on the fault tolerance information from the service, whether the service will tolerate the host becoming unavailable;

perform, by the management component, one or more actions based on the determining of whether the service will tolerate the host becoming unavailable, wherein the one or more actions comprise placing the host in a maintenance mode;

determine, by the management component, that a spare host is available; and re-create, by the management component, the data relating to the service from the host on the spare host.

* * * * *